United States Patent [19]

Morita et al.

[11] 4,016,544

[45] Apr. 5, 1977

[54] MEMORY WRITE-IN CONTROL SYSTEM FOR COLOR GRAPHIC DISPLAY

[75] Inventors: Takaya Morita; Masao Inaba; Yoitiro Hoshi, all of Tokyo, Japan

[73] Assignees: Tokyo Broadcasting System Inc.; Nippon Electric Company, Ltd., both of Tokyo, Japan

[22] Filed: June 17, 1975

[21] Appl. No.: 587,857

[30] Foreign Application Priority Data

June 20, 1974 Japan .............................. 49-70421

[52] U.S. Cl. .......................... 340/172.5; 340/324 R

[51] Int. Cl.² ............................................ G06F 3/14

[58] Field of Search ........ 340/172.5, 324 R, 324 A; 358/4; 445/1

[56] References Cited

UNITED STATES PATENTS

| | | | |
|---|---|---|---|
| 3,617,626 | 11/1971 | Bluth | 178/6.6 A |
| 3,623,005 | 11/1971 | Roberts | 340/172.5 |
| 3,697,956 | 10/1972 | Goldman et al. | 340/172.5 |
| 3,766,528 | 10/1973 | Ichida | 340/172.5 |
| 3,811,113 | 5/1974 | Saito et al. | 340/172.5 |
| 3,883,728 | 5/1975 | Schwartz et al. | 235/152 |
| 3,893,075 | 7/1975 | Orban et al. | 340/172.5 |

*Primary Examiner*—Mark E. Nusbaum
*Attorney, Agent, or Firm*—Hopgood, Calimafde, Kalil, Blaustein & Lieberman

[57] ABSTRACT

A memory write-in control system provides for each dot a plurality of color designating bits representing color information for the dot as well as a set of mask command bits corresponding to the respective color designating bits. The memory content is changed in accordance with the color designating bits only when the mask command bits are at one logic level. The memory bit content is unchanged when the mask command bits are at the other logic level irrespective of the color designating bits.

4 Claims, 6 Drawing Figures

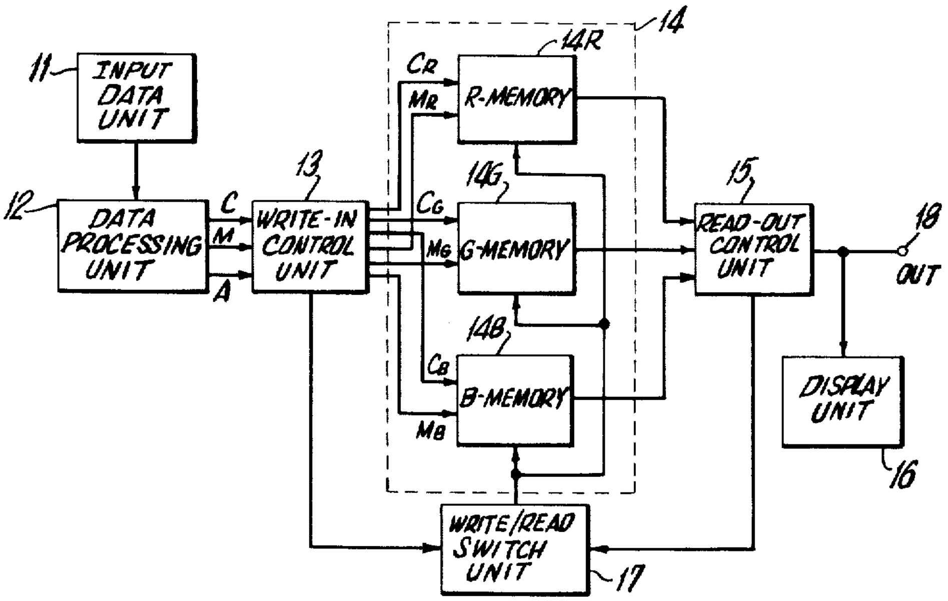
FIG. 1
| MASK COMMAND BIT M | COLOR DESIGNATING BIT C | BUFFER MEMORY BIT |
|---|---|---|
| 1 | 1 | 1 |
| | 0 | 0 |
| 0 | 1 | UNCHANGED |
| | 0 | |
FIG. 2
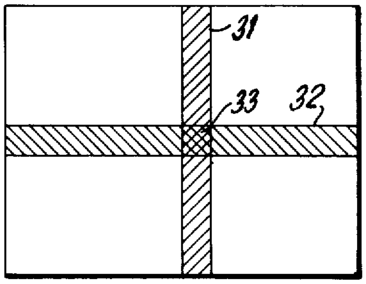
FIG. 3

| MASK COMMAND BIT M | COLOR DESIGNATING BIT C | BUFFER MEMORY BIT | |
|---|---|---|---|
| | | DOT DATA "1" | DOT DATA "0" |
| 1 | 1 | 1 | UNCHANGED |
| | 0 | 0 | |
| 0 | 1 | UNCHANGED | |
| | 0 | | |

MEMORY WRITE-IN CONTROL SYSTEM FOR COLOR GRAPHIC DISPLAY

This invention relates generally to color graphic display systems, and more particularly to a write-in control system for a buffer memory for use therein.

In a graphic display system adapted to display data as processed by a computer, data held in the computer and data from terminal equipment connected to the computer are processed by the computer. The processed data are stored in a buffer memory in the form of digital data representative of picture elements or dots to be displayed on a display panel. The data stored in the buffer memory are read out at a rate corresponding to the scanning rate of the display unit to be displayed thereon. New data supplied to the computer from any of the terminal equipment connected thereto, are processed by the computer and the resultant data obtained through the process are written on the buffer memory. With this write-in on the buffer memory, the data previously stored therein are erased. More specifically, in the case of a color graphic display system, color information is given for each dot in a combination of a plurality of color designating bits, for example, three bits respectively representing the primary colors, red, green and blue, and such color designating bits are simultaneously stored in the buffer memory for each dot and are read out therefrom by dots.

In a conventional color graphic display system, when a vertical line is displayed on the panel in red (corresponding, for example to a combination of color designating bits of "100"), the computer is ordered by data input from a terminal equipment to further display a horizontal line in green (corresponding, for example, to a combination of color designating bits of 010) in a position to intersect the red vertical line, the color at the portion of intersection is changed from the red 100 to green 010 so that the information previously displayed is partly erased at that portion. It might be possible to keep the red displayed at the portion of intersection or to display in a color other than red or green only at the portion of intersection by increasing the complexity of the software, but this would excessively complicate the software.

Further, in some cases, it is desired that data be processed not at the rate of a single dot per instruction but at the rate of a plurality, e.g., eight, of dots per instruction. In such cases, data change on the display panel is also effected by such sets of dots, so that when the number of dots to be changed is not a multiple of the number, e.g., eight, of dots to be simultaneously processed by the computer, a dot or dots to be kept unchanged are unavoidably changed.

It is, therefore, an object of the present invention to provide a memory write-in control system for a color graphic display in which color on the intersection portion may be freely designated with the use of simplified software.

Another object of the present invention is to provide a memory write-in control system in which the data changing may be performed by dot, while the process is performed at a rate of a plurality of dots per instruction.

According to the present invention, there is provided a buffer memory write-in control system which is arranged to provide for each dot a plurality of color designating bits representing color information for the dot and additionally a set of mask command bits corresponding to the respective color designating bits and which functions to change the buffer memory content (buffer memory bits) stored in the buffer memory in accordance with the color designating bits only when the mask command bits are at one logic level, and to leave the buffer memory content unchanged when the mask command bits are at the other logic level irrespective of the color designating bits.

The above and other objects, features and advantages of the present invention will become apparent from the following description when taken in conjunction with the accompanying drawings, wherein:

FIG. 1 is a block diagram of a memory write-in control system according to a first embodiment of the invention;

FIG. 2 is a diagram explaining the mode of operation of the first embodiment;

FIG. 3 is a diagram illustrating the effect of the memory write-in control system of the present invention as observed on a display panel;

Figures 4, 5:
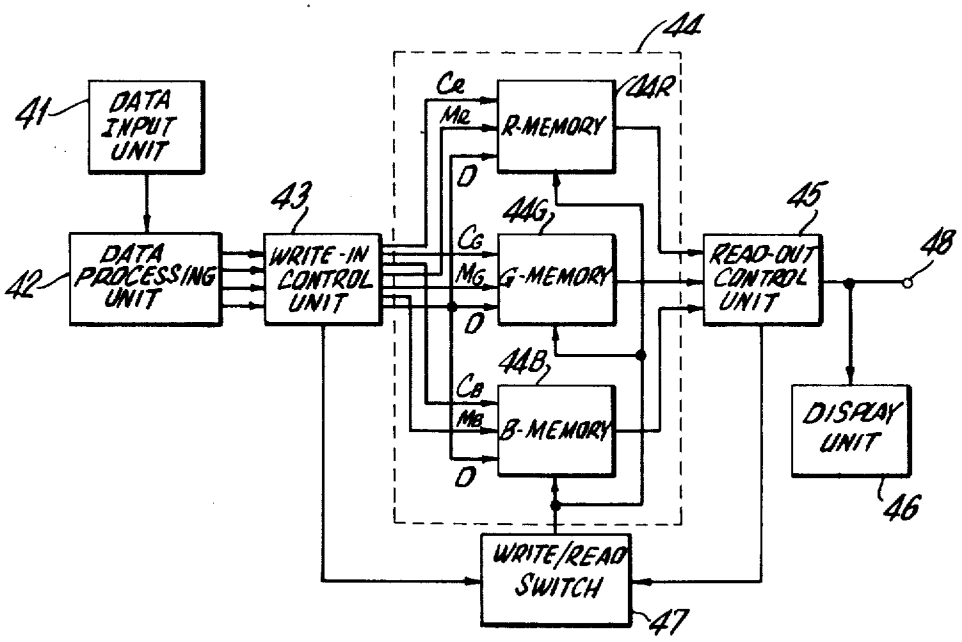
FIG. 4 is a block diagram of a memory write-in control system according to a second embodiment of the invention.
FIG. 5 is a diagram explaining the mode of operation of the second embodiment.

FIG. 1 illustrates a first embodiment of the present invention as applied to a color graphic display system operable to deal with one dot under each instruction from a computer. As illustrated, the first embodiment includes a data input unit 11, a data processing unit or computer 12 receiving data from input device 11, and a write-in control unit 13 connected to the computer A buffer memory 14 comprised of three memory units 14R, 14G and 14B provided for storing red, green and blue information dots, respectively receives signals from write-in control unit 13 and has its outputs applied to a read-out control unit 15. A display unit 16 is connected to the output of unit 15 as is an output terminal 18. A write-read switch unit 17 receives inputs from write-in control unit 13 and from read-out control unit 15 and applies signals to each of memory units 14R, 14G, and 14B. Data from the data input unit 11 as well as data stored in the computer 12 itself are properly processed by the computer 12 and the write-in control unit 13 connected with the computer 12 is fed therefrom with instructions each including for a single dot: a color code C comprised of three color designating bits $C_R$, $C_G$ and $C_B$ representing the respective dot colors of red, green and blue, a mask code M comprised of three mask command bits $M_R$, $M_G$ and $M_B$ corresponding to the respective color designating bits, and an information A representing the dot address.

The write-in control unit 13 is designed to operate upon a receiving mask code M and a color code C from the computer 12 to effect a change of the buffer memory bits stored in the buffer memory 14 in the manner shown in FIG. 2. In other words, if the mask code command bit M received is of logic 1, the write-in control unit 13 operates in a conventional manner to change the buffer memory bit to the value corresponding to the color designating bit irrespective of the bit previously stored in the buffer memory 14. If the mask command code bit M is logic 0, the device leaves the buffer memory bit unchanged irrespective of the color code designating bit C. In this manner, the write-in control unit transmits a write-in instruction to the buffer memory 14 upon reception of a mask code command bit M of logic 1 and acts upon reception of a mask code command bit of logic 0 to check any such instruction to the buffer memory 14 so that no writing is effected therein at the dot address even with the existence of a color designating bit and an address information.

To display a red vertical line on the display panel, as indicated by 31 in FIG. 3, the contents of the buffer memory 14, that is, all the buffer memory bits are turned to logic 0 and thereafter the mask code M ($M_R$, $M_G$ and $M_B$) and color code C ($CH_R$, $C_B$ and $C_B$) are both fed from computer 12 to a write-in control unit 13 both in the form of 100. Thus, with the mask code command bits $M_G$ and $M_B$ both of logic 0, the write-in control instructions to G-memory 14G and B-memory 14B are both checked and the buffer memory bits in these memories re kept unchanged irrespective of the color designating bits $C_G$ and $C_B$. On the other hand, the color designating bit $C_R$, of logic 1, is written in R memory 14R at the designated address as the mask command bit $M_R$ is of logic 1. The information written in the buffer memory 14 in this manner is read out under the control of the read control device 15 and is transformed into a signal form adapted to be displayed on the display unit 16. As this information signal is fed to the display unit 16, a red vertical line is displayed on the panel thereof.

Subsequently, when further data are fed from the data input unit 11 to the computer 12 if the latter processing such data forms a judgment that a green horizontal line is to be displayed on the display panel in intersecting relation with the red vertical line 31, as indicated at 32, and that the portion of intersection 33 is to be displayed in yellow, the computer 12 sends to the write-in control unit 13 a mask code 010 and a color code 010 together with an address information. The write-in control unit 13 this time acts to check any writing instructions directed to R memory 14R and B memory 14B since the mask command bits $M_R$ and $M_B$ are both of logic 0. Thus, the memory bits stored in the two memories 14R and 14B are kept unchanged. On the other hand, bits 1 are written in the G memory 14G in accordance with the color designating bit $C_G$ at the addresses corresponding to the position of the green horizontal line 32 on the display panel. As a result, the buffer memory 14 includes a code 110 held at an address corresponding to the portion of intersection 33, codes 100 at addresses corresponding to the vertical line 31 exclusive of the portion of intersection 33, and codes 010 at addresses corresponding to the horizontal line 32 exclusive of the portion of intersection 33. It will be readily appreciated that the display obtainable by the reading of the buffer memory 14 written in the manner described includes the portion of intersection 33 displayed in yellow and thus differs in color from either of the vertical and horizontal lines 31 and 32.

Although in the above-described example two intersecting lines are displayed with the portion of intersection displayed in a color other than the colors of the respective lines, it is to be noted that the portion of the intersection can also be displayed in the same color as the line added, that is, in green, by use of a mask code of 110.

FIG. 4 illustrates a second embodiment of the present invention as applied to a system arranged to deal with eight dots under each instruction from a computer. As shown, this embodiment includes a data input unit 41, a data processing unit or computer 42 receiving data from unit 41, and, a write-in control unit 43 connected to unit 42. A buffer memory 44 comprised of an R-memory 44R, a G-memory 44G and a B-memory 44B receives inputs from write-in control unit 43, and has its outputs connected to a read-out control unit 45. A display unit 46, a write-read switch or changeover unit 47 and an output terminal 48 are all connected to the read-out control unit 45. Switch 47 also receives an input from write-in control unit 43 and provides inputs to memories 44R, 44G, and 44B.

The control system of FIG. 4 is arranged to operate by dot groups each including eight dots to be processed under a single instruction from the computer. In other words, the computer 42 is arranged to send instructions to the write-in control unit 43 instructions each including for a group of eight dots: a color code C consisting of three color designating bits $C_R$, $C_G$ and $C_B$ indicating red, green and blue, respectively, a mask code M consisting of three mask command bits $M_R$, $M_G$ and $M_B$, dot data D of eight bits ($D_0$, $D_1$, $D_2$ . . . . , $D_7$) indicating which of the eight dots to be dealt with under the single instruction is to be masked, and an address information for the dot group.

The write-in control unit 43, receiving a mask code M, a color code C and dot data D from the computer 42, operates to change the contents or bits stored in the buffer memory 44, in the manner shown in FIG. 5. Namely, the write-in control device 43 serves the function of controlling the write-in on the buffer memory 44 so that the buffer memory bits are changed in accordance with the color designation as in any conventional system when the mask command bits and the dot data are both of logic 1 whereas the buffer memory bits are all kept unchanged when the mask command bits are logic 1 and the dot data are logic 0 and also when the mask command bits are logic 0.

Figure 6:
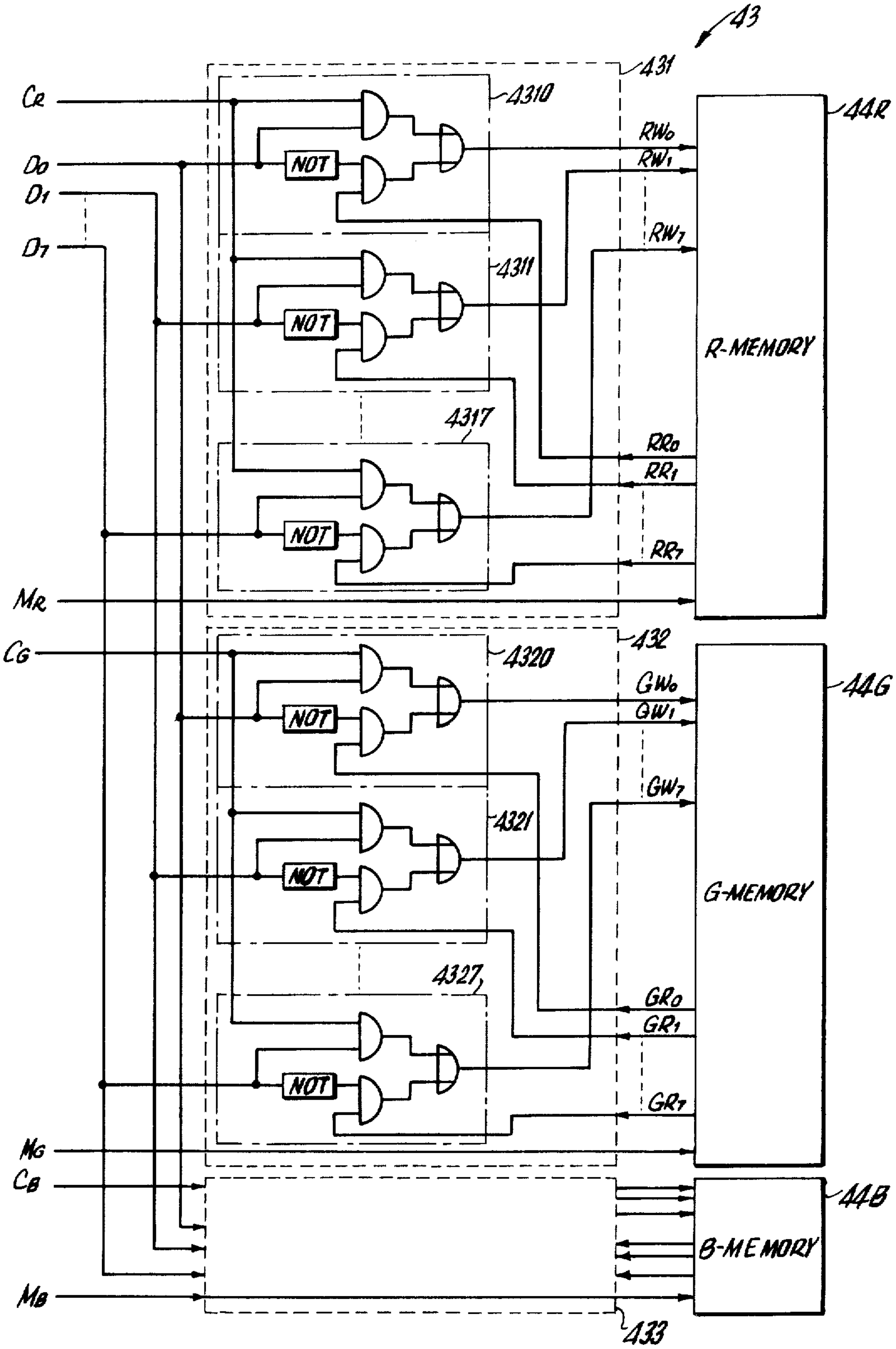
FIG. 6 is a detailed block diagram of the write-in control section of the second embodiment.

FIG. 6 shows one example of write-in control unit 43, which includes an R memory write-in controlling section 431, a G memory write-in section 432 and a B memory write-in controlling section 433, the latter being shown only in outline form since it is essentially the same as the other two controlling sections. Since these write-in controlling sections are all the same in construction and arrangement, description is made herein only of the B-memory write-in controlling section 431. For the purpose of processing a group of eight dots under each single instruction from the computer, the write-in controlling section 431 includes eight logic circuits 4310, 4311, . . . . , 4317, for the respective dot addresses No. 0 to No. 7 within the group. These logic circuits are all the same in construction and each include: a first AND circuit for receiving the color designating bit $C_R$ and one of dot data $D_0$, $D_1$, . . . . or $D_7$, a NOT circuit for negating dot data, a second AND circuit for receiving the negated dot data and the information stored in the R memory at an address corresponding to the dot address in the group (that is, one of the information $RR_0$, $RR_1$, . . . , $RR_7$ which corresponds to such address), and an OR circuit for receiving the outputs from the first and second AND circuits. The output from the OR circuits of the logic circuits 4310, 4311, . . . . , 4317, or write-in information $RW_0$, $RW_1$, . . . . , $RW_7$ are directed to the R-memory 44R. Further, the write-in controlling section 431 is arranged to send a write-in instruction to the R-memory 44R upon reception of a mask command bit $M_R$ of logic 1 and to check such write-in instruction upon reception of a mask command bit $M_R$ of logic 0.

As illustrated, the dot data $D_0$, $D_1$, . . . . , $D_7$ are supplied simultaneously to all of the three write-in controlling sections 431, 432 and 433. The write-in controlling section 432 is also fed with a color designating bit $C_G$, a mask command bit $M_G$ and information $GR_0$, $GR_1$, . . . . , $GR_7$ as read from the G memory 44G and sends out write-in information $GW_0$, $GW_1$, . . . . , $GW_7$ and a write-in instruction to the G memory 44G. Similarly, the write-in controlling section 433 receives a color designating bit $C_B$, a mask command bit $M_B$ and information $BR_0$, $BR_1$, . . . . , $BR_7$ as read from the B memory 44B, and sends out write-in information $BW_0$, $BW_1$, . . . . , $BW_7$ and a write-in instruction to the B-memory.

Description is now made of the operation of the R memory write-in controlling section 431 as an example. If the given mask command bit $M_R$ is of logic 0, the write-in instruction directed to the R memory is checked and thus any of the write-in information $RW_0$, $RW_1$, . . . . , $RW_7$ cannot be written therein, leaving the buffer memory bits in the R memory unchanged. The write-in instruction is transmitted only when the mask command bit $M_R$ is logic 1. Assuming that the dot data $D_0$ for the dot address No. 0 is logic 1, the color designating bit $C_R$ entering the logic circuit 4310 appears at the output of the first AND circuit thereof while the second AND circuit is closed. As a result, the color designating bit $C_R$ is obtained as a write-in information $RW_0$ at the output of the OR circuit and such bit is written in the R memory as long as the mask command bit $M_R$ is logic 1. When the dot data $D_1$ is 0, the first AND circuit of the logic circuit 4311 is closed and the information $RR_1$ held in the R-memory 44R at the corresponding address appears at the output of the second AND circuit of the logic circuit 4311. Such information $RR_1$, read from the R memory, appears at the output of the OR circuit as a write-in information $RW_1$, and is again written in the R memory as long as the mask command bit $M_R$ is of logic 1. This means that the buffer memory bits remain unchanged.

It will be appreciated from the foregoing description of the embodiment of FIG. 4 that the write-in control unit 43 serves the write-in controlling function in the manner shown in FIG. 5, making it possible to change information on any single dot within the same dot group depending upon the combination of dot data for the group.

It will also be appreciated that the write-in control system of the invention meets all of the objects set forth above and that modifications to the specifically described embodiments may be made thereto without necessarily departing from the spirit and scope of the invention.

What is claimed is:

1. A color graphic display system for displaying data supplied from a data processing unit on a display unit, said data having been stored and processed in said data processing unit in accordance with an instruction received from a data input means, said display system comprising:

memory means for storing data from said data processing unit;

means operatively interposed intermediate said data processing unit and said memory means for controlling the write-in of data in said memory means;

means operatively connected to said memory means for controlling the read-out of the data stored in said memory means;

means for supplying the read out data to said display unit;

said data from said data processing unit including color designating bits, mask command bits, and address data, and means for controlling said write-in controlling means in accordance with said mask command bits, said last-mentioned means including means for changing the content of the location in said memory means specified by said address data in accordance with said color designating bits when said mask command bits are of one logic level and for maintaining the content of said memory location unchanged when said mask command bits are of the other logic level.

2. The color graphic display system as claimed in claim 1 wherein said data processing unit processes the data corresponding to a dot group comprised of a plurality of dots on the display unit per one instruction, said data from said data processing unit further including a plurality of dot data for each dot group, and said dot data corresponding to the respective dot in each dot group.

3. The color graphic display system as claimed in claim 2, further including means for changing the content of said memory means in accordance with said color designating bits only when said mask command bits and said dot data are of one logic level.

4. The color graphic display system as claimed in claim 3, wherein said memory means comprises a plurality of memories for storing the data corresponding to a plurality of color components, and said write-in controlling means comprises a plurality of memory controllers for controlling the write-in, each of said memory controllers comprising:

a first AND-circuit receiving said color designating bit;

a NOT-circuit for negating said dot data;

a second AND-circuit receiving the negated dot data; and an OR-circuit connected to the outputs of said first and second AND-circuits.

* * * * *